United States Patent

[11] 3,578,186

| [72] | Inventor | Henry D. Thomas<br>16180 Markese Ave., Allen Park, Mich.<br>48101 |
|---|---|---|
| [21] | Appl. No. | 815,136 |
| [22] | Filed | Apr. 10, 1969 |
| [45] | Patented | May 11, 1971 |

[54] VEHICLE UNLOADER
14 Claims, 11 Drawing Figs.

[52] U.S. Cl. .................................................. 214/83.22, 214/82
[51] Int. Cl. .................................................. B60p 1/36
[50] Field of Search.......................................... 214/83.22, 83.34, 82; 296/24

[56] References Cited
UNITED STATES PATENTS

| 1,927,653 | 9/1933 | Wehr | 214/83.22X |
| 2,454,101 | 11/1948 | Snead | 214/83.22 |
| 3,240,370 | 3/1966 | Sadler | 214/83.22X |
| 3,273,728 | 9/1966 | Kelso | 214/82 |
| 3,342,354 | 9/1967 | Behr | 214/83.22 |

*Primary Examiner*—Albert J. Makay
*Attorney*—Barnes, Kisselle, Raisch & Choate

ABSTRACT: A pusher and a floor belt in a dump box of a vehicle for unloading or dumping material from the dump box. The pusher and the belt are moved longitudinally through the dump box by a winch and interconnecting cables. Batch boards and a tailgate are also carried by tracks connected to the dump box to provide separate compartments for carrying individual batches of material. In one modification the tracks are arranged so that the tailgate and sequentially each batch board can be moved to the rear of the dump box beyond the floor belt so that the material on the belt will be discharged from the dump box as the pusher is moved toward the rear of the box.

Patented May 11, 1971
3,578,186
4 Sheets-Sheet 1
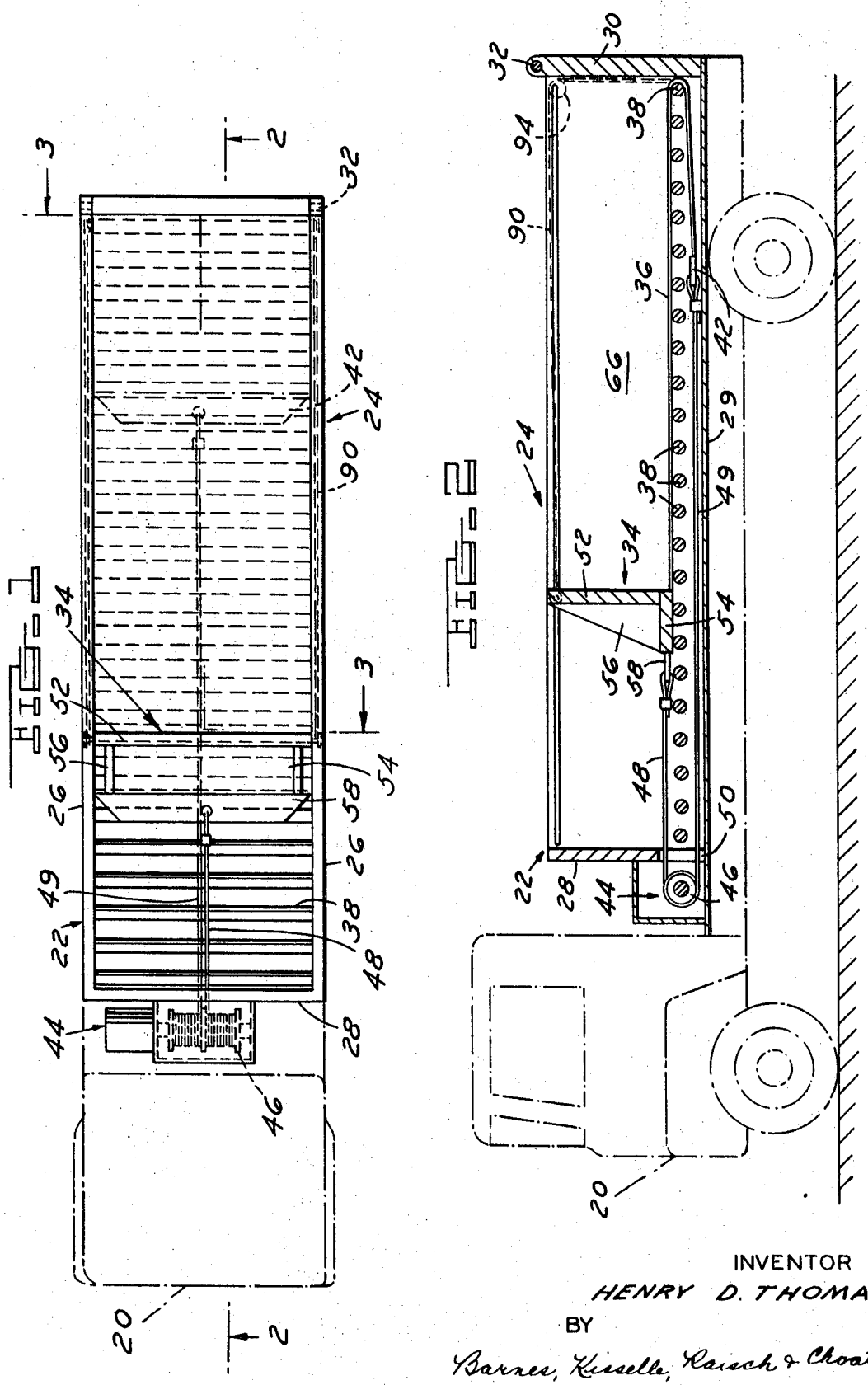
INVENTOR
HENRY D. THOMAS
BY
Barnes, Kisselle, Raisch & Choate
ATTORNEYS Patented May 11, 1971
3,578,186
4 Sheets-Sheet 2
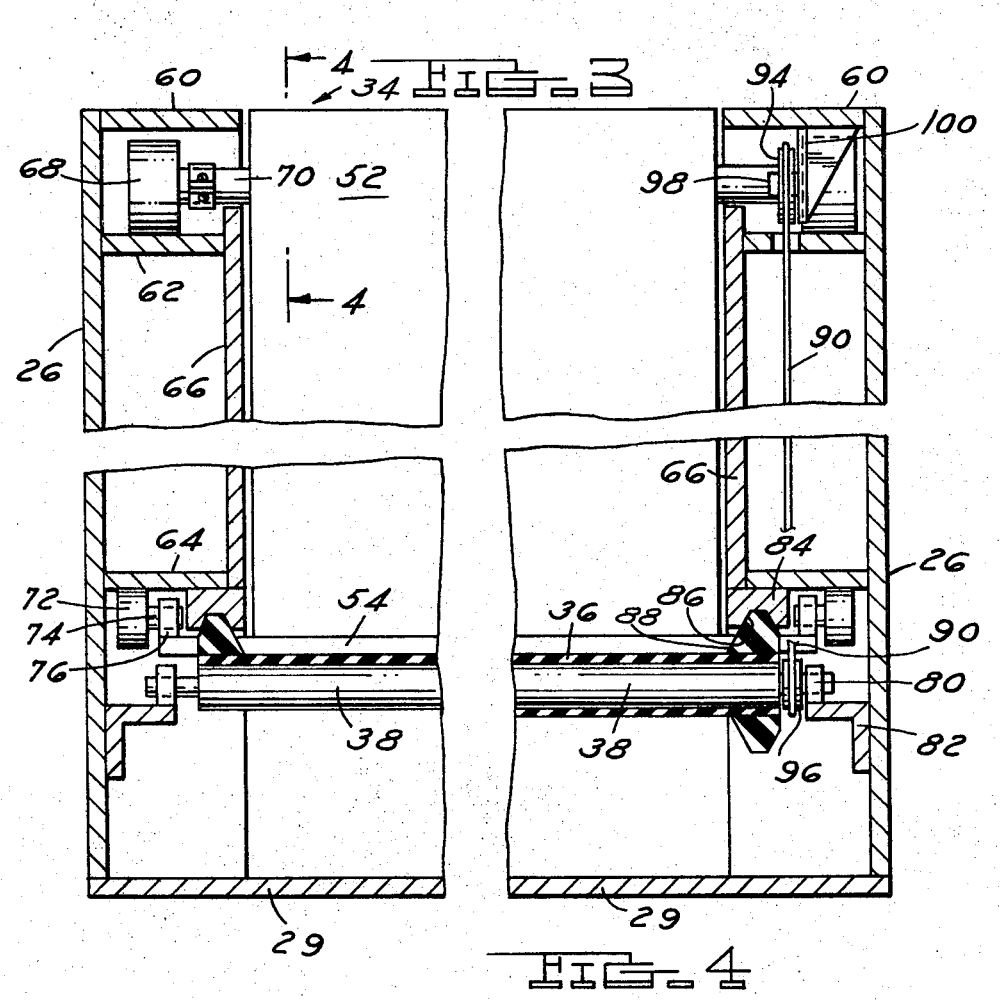
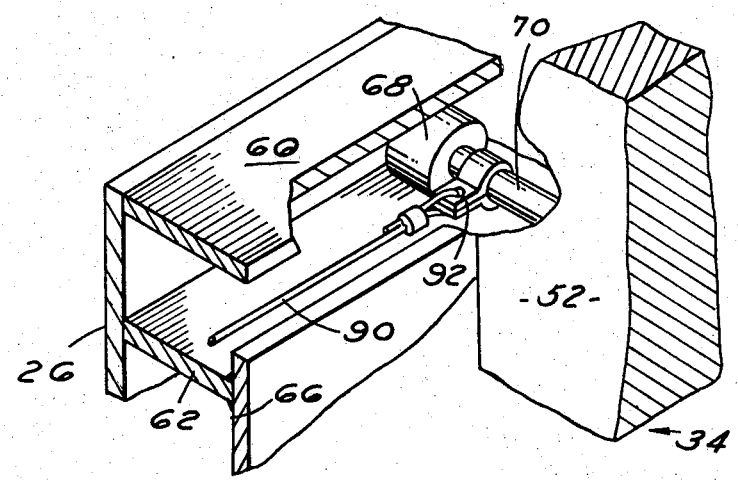
INVENTOR
HENRY D. THOMAS
BY
Barnes, Kisselle, Raisch & Choate
ATTORNEYS Patented May 11, 1971
3,578,186
4 Sheets-Sheet 3
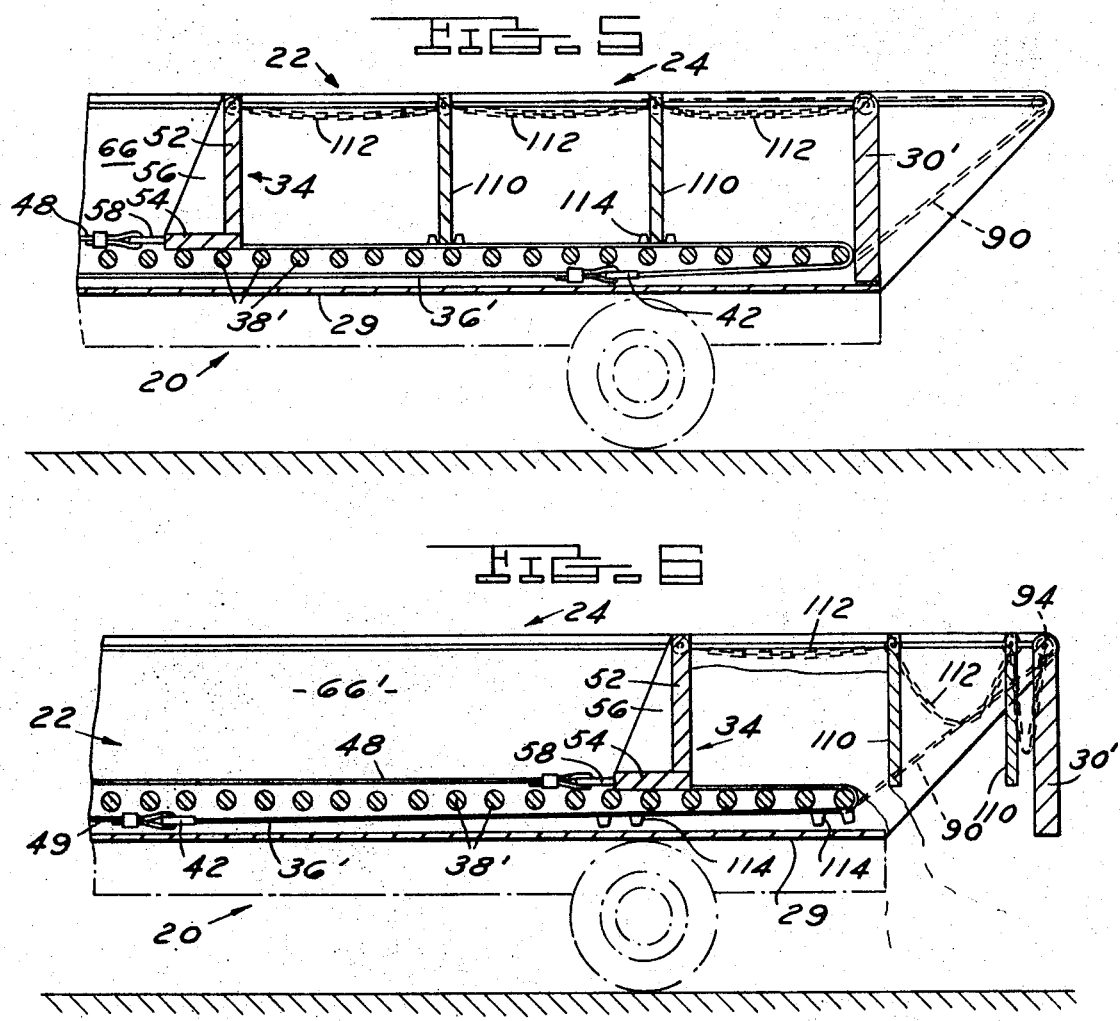
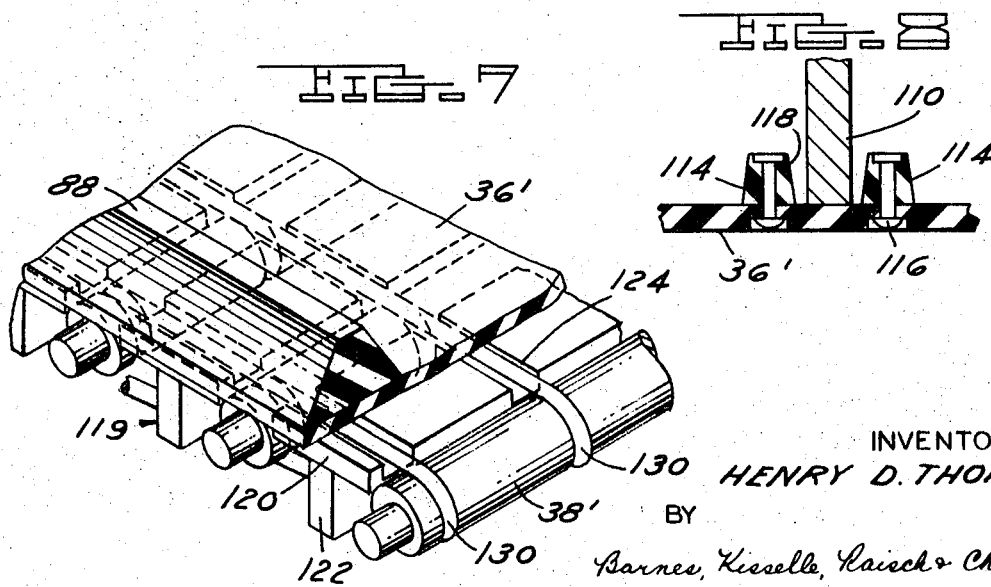
INVENTOR
HENRY D. THOMAS
BY
Barnes, Kisselle, Raisch & Choate
ATTORNEYS

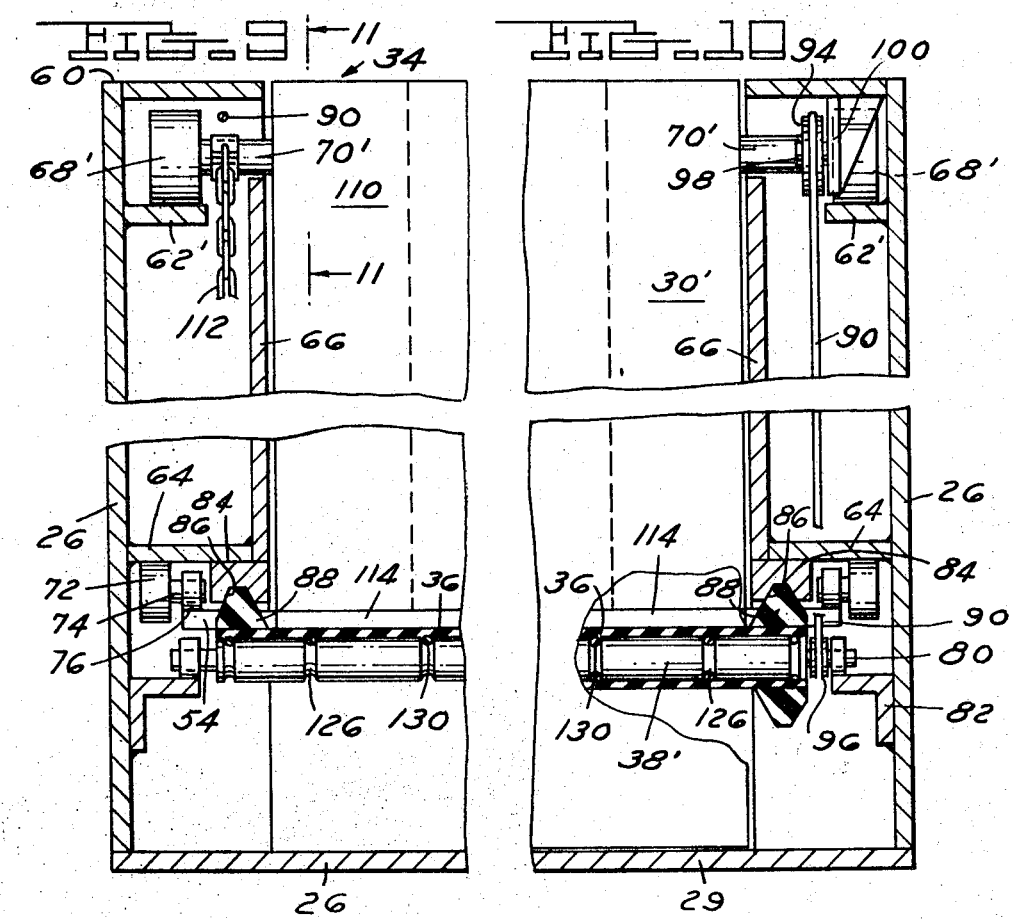
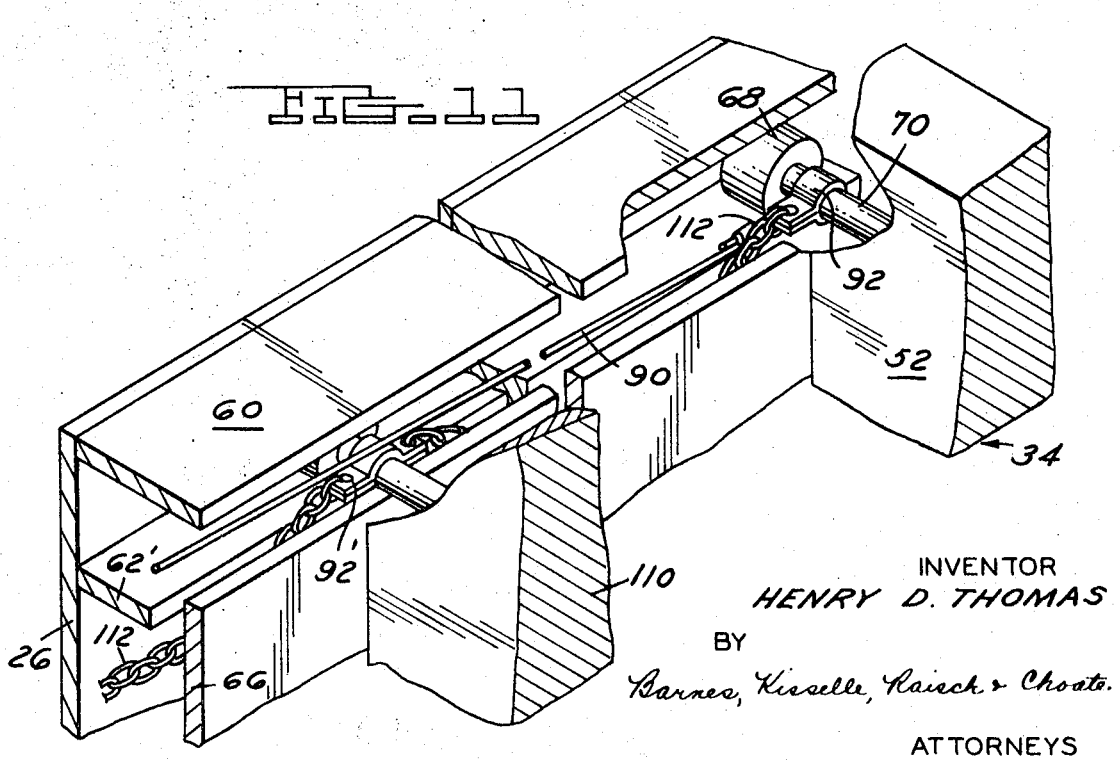

VEHICLE UNLOADER

This invention relates to a mechanism for unloading material from a vehicle and more particularly to a mechanism that is capable of unloading or dumping loose materials, such a coal, sand, gravel, asphalt, etc., from a vehicle dump box.

Objects of this invention are: (1) to unload materials in areas where the overhead clearance is so low that the box on a conventional dump truck cannot be adequately raised or tilted to unload the material; (2) to simultaneously transport a plurality of separate batches of material; (3) to reduce the leakage from and hence loss of loose materials being transported in the vehicle; (4) to facilitate the unloading of materials by providing a convenient arrangement for automatically sorting the tailgate and other components of the mechanism when they are not being used in the unloading cycle; and (5) to provide a mechanism of rugged, economical construction and assembly requiring little service or maintenance.

These and other objects, features and advantages of this invention will be apparent from the following description and drawings in which:

FIG. 1 is a plan view of a vehicle with the unloading mechanism of this invention.

FIG. 2 is a sectional view on line 2–2 of FIG. 1 illustrating the general arrangement of the various components of the unloading mechanism of this invention.

FIG. 3 is a sectional view on line 3–3 of FIG. 1 illustrating the arrangement of guide tracks, rollers for a floor belt, and a pusher of the mechanism of this invention.

FIG. 4 is a fragmentary isometric view partially in section on line 4–4 of FIG. 3 illustrating the details of the guide track, rollers, and cables for the pusher.

FIG. 5 is a side view in section of a first modification of the unloading mechanism of FIG. 1 with batch boards and a tailgate illustrated in the operative position so that the body can be loaded or filled with material.

FIG. 6 is a side view in section of the first modification of FIG. 5 with the tailgate and batch boards illustrated in the position they assume when the vehicle body is being unloaded or dumped.

FIG. 7 is a fragmentary isometric view partially in section of a modification of the structure for supporting and traversing the floor belt.

FIG. 8 is a fragmentary sectional view of a portion of the belt and a batch l board illustrating a channel structure which restricts movement of the batch board with respect to the floor belt.

FIG. 9 is a fragmentary cross-sectional view of the first modification illustrating a guide roller and spacer chain connected to a batch board and an arrangement of cables to move the pusher.

FIG. 10 is a fragmentary cross-sectional view of the first modification illustrating a guide roller and spacer chain arrangement for the tailgate and the cable arrangement for moving the pusher.

FIG. 11 is a fragmentary isometric view partially in section on line 11–11 of FIG. 9 illustrating the details of a guide roller and spacer chain arrangement for the batch boards and pusher of the first modification of the unloading mechanism.

Referring to the drawings:

FIGS. 1 and 2 illustrate a truck 20 with a dump box 22 for carrying material and an unloading mechanism designated generally as 24 mounted on the bed of truck 20. Box 22 has generally parallel sidewalls 26, an end wall 28, a bottom 29 and a tailgate 30 pivotally connected adjacent its top to sidewalls 26 by a shaft 32. Tailgate 30 can be locked in its closed position by a suitable latch not shown. In general, unloading mechanism 24 is a pusher 34 attached to one end of a flexible floor belt 36 supported by a plurality of rollers 38. The other end of belt 36 passes around an end roller 38 adjacent tailgate 30 and is connected to a transverse pull bar 42. A winch 44 with a double spool or drum 46 is anchored to the bed of truck 20 adjacent end wall 28 and cables 48 and 49 wrapped around drum 46 extend through an opening 50 in wall 28 and are respectively connected to pusher 34 and pull bar 42 to provide a means for moving belt 36 and pusher 34 in opposite directions on support rollers 38 through box 22. Pusher 34 is a vertical steel plate 52 welded to a horizontal baseplate 54 and reinforced by gussets 56 welded to the vertical and baseplates. A steel pull bar 58 is welded to baseplate 54.

As illustrated in FIG. 3, a plurality of steel plates and brackets are welded to the interior of sidewalls 26 to form tracks to guide and carry pusher 34 and to support belt rollers 38. Longitudinally extending steel plates 60, 62 and 64 are welded to the interior surface of sidewalls 26 in vertically spaced relationship and steel wall plates 66 are positioned to extend above plates 62 and lie parallel to sidewalls 26. Plates 66 are welded to the innermost edges of plates 62 and 64 and cooperate therewith to provide longitudinally extending tracks to guide the movement of pusher 34 through box 22 and to form interior sidewalls in box 22. Pusher 34 is mounted for movement on the guide tracks by rollers 68 mounted for rotation on stub shafts 70 connected to the upper portion of vertical plate 52 and rollers 72 mounted for rotation on stub shafts 74 connected to brackets 76 welded to the outer extremities of baseplate 54 of the pusher. Belt rollers 38 are journaled in bearing blocks 80 which are mounted on steel L-shaped support blocks 82 welded to the interior surface of sidewalls 26 adjacent their lower edges to provide a support for belt 36.

A seal is provided between flexible belt 36 and the lower portion of interior sideplates 66 so that loose material placed in box 22 will not leak out. This seal also prevents the loose material from getting into and fouling or clogging journals 80 or rollers 38 and the lower portion of the track which guides and carries the pusher. This seal is provided adjacent each edge of belt 36 by steel blocks 84 attached to plate 64 and having a truncated V-shaped groove 86, opening downward, which engages and cooperates with a truncated triangular-shaped sealing block 88 of a flexible material, such as rubber, attached to the outer edges of belt 36. Each block 84 and its groove 86 extend longitudinally substantially the entire length of box 22 and flexible sealing blocks 88 extend substantially the entire longitudinal length of belt 36. Belt 36 is formed of a flexible material, such as rubber, and sealing blocks 88 can either be fastened to belt 36 by a suitable means such as rivets or formed as an integral part of belt 36.

Because of the substantial resistance to the movement of pusher 34 toward tailgate 30 provided by a full load of loose material in box 22, the force developed by winch 44 is applied to both the upper and lower portions of pusher 34 so that it will not be tilted from its upright or vertical position which would cause the pusher 34 to become jammed or wedged in its guide track. This force created by winch 44 is applied to the lower portion of pusher 34 through belt 36 and to the upper portion of pusher 34 through flexible steel cables 90. As shown in FIG. 4, each cable 90 is attached at one end through a stub shaft 70 to pusher 34 by a bracket 92 encircling the stub shaft. Each cable 90 extends longitudinally through the upper channel of guide track, passes over a guide pulley 94 (see FIG. 3) adjacent the upper portion of tailgate 30, extends downwardly parallel to tailgate 30, passes around a guide pulley 96 adjacent the lower portion of tailgate 30 and is connected at its other end to pull bar 42. As shown in FIG. 3, guide pulleys 96 are mounted for rotation on the journal portion adjacent the outer edges of the roller 38 to serve as guides and idler pulleys for cable 90. Each pulley 94 is mounted for rotation on a stub shaft 98 which is connected to a steel bracket 100 welded to the underside of plate 60.

In operating the unloading mechanism of this invention, winch 44 is operated so that cable 48 will be foreshortened and cable 49 lengthened which causes pusher 34 and belt 36 to move to the front end of vehicle 20 so that substantially the entire length of box 22 can be used to hold a load of material. Tailgate 30 is locked in the closed position and box 22 is filled with loose material which is then transported by vehicle 20 to the place where it is desired to unload the material. To unload the material tailgate 30 is unlocked and winch 44 is manipulated so that cable 48 is lengthened and cable 49 is foreshortened. As cable 49 is foreshortened it applies a force to pusher 34 through belt 36 and cables 90 which causes pusher 34 and the load of material to be moved toward tailgate 30. As the material bears on tailgate 30, the tailgate swings open and the material is dumped from box 22. If it is desired to dump only a part of the load of loose material, the direction of rotation of winch 44 can be reversed after pusher 34 has traveled only part way toward tailgate 30. This will cause cable 48 to be foreshortened and cable 49 to be lengthened, thereby moving pusher 34, belt 36 and the material toward the front of vehicle 20. Once the material has been moved away from tailgate 30, the tailgate can be again locked in the closed position.

FIGS. 5 and 6 illustrate a first modification of this invention in which box 22 is segmented or divided into several separate compartments so that loose materials can be transported in separate batches. This allows box 22 to be used either to simultaneously transport several different types of loose material or to divide the loose material into different sized quantities so that precise quantities of a material can be dumped at different locations. In this modification the sidewalls of the box and the upper channels of the pusher guide track are extended rearward substantially beyond the end of the floor belt to provide a means for temporarily stacking or positioning the tailgate and each of the partitions as the box is unloaded so that they will not interfere with the discharge of loose material from the end of the floor belt. As shown in FIGS. 5 and 9, each batch board 110 which divides box 22 into separate compartments is suspended in the upper channels of the pusher guide tracks by rollers 68' mounted for rotation on stub shafts 70' which are rigidly connected to the upper portion of batch board 110 so that it can be moved longitudinally through box 22. In a similar manner, as illustrated in FIG. 10, tailgate 30' is mounted for longitudinal movement in the upper channels of the pusher guide tracks by rollers 68' mounted for rotation on stub shaft 70' rigidly secured to the upper portion of tailgate 30'. Chains 112 control the spacing between batch boards 110, tailgate 30' and pusher 34 so that the batch boards will be properly aligned with the channels on belt 30' which captivate the lower end of the batch boards (as shown in FIG. 5). Links of chain 112 are connected to tailgate 30', batch boards 110 and pusher 34 through stub shafts 70 and 70' by brackets 92 and 92'. As shown in FIGS. 9, 10 and 11, plate 62' has been narrowed to provide an opening or slot between plate 62' and sidewall plate 66 so that there is adequate clearance for chains 112 to prevent them from becoming caught between the guide track and rollers 68 and 68' when the pusher, batch boards and tailgate are moved. As shown in FIG. 8, the channels for captivating the lower end of batch boards 110 are formed by two banking strips 114 in spaced apart parallel relationship each extending transversely across the belt 36' and secured thereto by rivets 116. Sides 118 of banking strips 114 are slightly inclined to assist in guiding the lower portion of batch load 110 into the channel formed by strips 114.

FIGS. 7, 9 and 10 illustrate a modification of the unloading structure of this invention to increase the maximum weight load which it can carry. As illustrated in FIG. 7, a plurality of T-shaped supports 119 comprising a horizontal steel plate 120 overlying and welded to a vertical steel plate 122 are interposed between adjacent rollers 38' and secured to sidewalls 26 to provide additional support or bearing surface for flexible belt 36'. The use of these supports underlying belt 36' increases the load carrying capability of the belt. Slots 124 are provided in the belt supports and grooves 126 are provided in rollers 38' to accommodate cables 130 which are connected at one end to pusher 34, extend around the roller 38' adjacent tailgate 30' and are connected at their other end to pull bar 42. Cables 130 both reduce the tension or stress that is placed on belt 36' when winch 44 is actuated to move pusher 34 toward tailgate 30' and increase the maximum load that can be moved by the pusher and belt assembly.

In operating the modified structure shown in FIGS. 5 through 11, winch 44 is actuated so that cable 48 is foreshortened and cable 49 lengthened causing pusher 34 to move toward the front of vehicle 20. As pusher 34 moves toward the front of vehicle 20, chains 112 become taut, sequentially, and move batch boards 110 and tailgate 30 toward the front of the vehicle so that they assume the position shown in FIG. 5 when pusher 34 has moved fully forward. As each batch board in moving toward the front of vehicle 20 approaches the roller 38' at the rear of box 22, the lower portion of the batch board registers with and is captivated in the channel formed by runners 114 on belt 36' so that it cannot be longitudinally displaced with respect to the belt. After pusher 34 has been moved fully forward, tailgate 30' is locked in place and each section or compartment of box 22 can be filled or loaded with a material to be transported. The channels formed by runners 114 in cooperation with the taut chains 112 prevent batch boards 110 from being displaced by the material placed in each compartment. The material in each compartment is unloaded by unlocking tailgate 30' and activating winch 44 so that cable 49 is foreshortened and cable 48 is lengthened causing pusher 34 and belt 36' to move toward tailgate 30'. As the material is moved toward the rear of the vehicle, it bears on tailgate 30' and displaces or moves it away from the belt (as shown in FIG. 6) so that the material between the tailgate and the adjacent batch board 110 is unloaded and dumped from the end of belt 36'. As the lower portion of each batch board is released by strips 114 being moved to the underside of the belt, due to its being advanced by the foreshortening of cable 49, the material bearing against it urges the batch board toward the rear of the vehicle which allows the material to be dumped from the vehicle and forces the batch board beyond the end of the belt (as shown in FIG. 6) so that it will not interfere with the dumping of the material.

Since the mechanism of this invention unloads material from the box while it is in a horizontal position, this unloader can be used in situations where the overhead clearance is so slight that a conventional tilting dump box cannot be tilted to dump the load. The seals between the floor belt and the interior sidewalls prevent material from being lost due to leakage. The seals also prevent material from contaminating and adversely affecting the bearings for the belt rollers. The batch boards provide a convenient way of separating loose material so that either several different kinds of material can be simultaneously shipped or exact quantities of a material can be unloaded at each of several stops. The mounting of both the tailgate and the batch boards on a track extending rearwardly beyond the belt provides a convenient way of handling and temporarily storing the tailgate and batch boards when the box is being unloaded. This arrangement also facilitates unloading of the material by positioning the tailgate and batch boards so that they will not interfere with the flow or dumping of material from the end of the belt. The use of cables to relieve the strain on the belt when the pusher is moved by the winch and of rollers and support plates to carry the load of material bearing on the belt provides a rugged and economically constructed and assembled unloading mechanism which requires a minimum of maintenance, repair and service.

I claim:

1. An unloading device for a vehicle body with sidewalls comprising, a generally nonextensible flexible floor belt having upper and lower runs extending longitudinally of the body between said sidewalls, floor belt load supports underlying at least a portion of the belt for slideably supporting the belt for longitudinal movement between the sidewalls, a generally vertically extending pusher between said sidewalls, guide means on the sidewalls for guiding movement of the pusher lengthwise of the sidewalls, said pusher being fixedly connected adjacent its lower end to said belt for movement therewith and so that a pull on said belt is transmitted to the lower end of said pusher, first tension means connected to the belt and second tension means connected to said pusher adjacent the upper end thereof, and extending rearwardly then downwardly then forwardly and connected to the lower run of said belt at a point remote from its connection with said pusher for applying a pulling force to said belt and simultaneously to said pusher adjacent both the upper and lower ends thereof.

2. The unloading device for a vehicle body as defined in claim 1 in which said floor belt load supports comprise rollers.

3. The unloading device for a vehicle body as defined in claim 1 including seals which comprise longitudinally extending first blocks with grooves therein carried by the body and second blocks of the flexible material engaging in said grooves connected to and extending longitudinally of said belt.

4. The unloading device for a vehicle body as defined in claim 1 in which said second tension means comprises cables connected to said pusher and to said belt so that foreshortening of said cables imparts longitudinal movement to said pusher and said belt.

5. An unloading device for a vehicle body with sidewalls comprising:
   a. a floor belt extending longitudinally of the sidewalls, said belt having at least one channel extending generally transversely of said belt,
   b. floor belt load supports underlying at least a portion of said belt,
   c. tracks extending generally longitudinally of and connected to each of the sidewalls, said tracks being generally parallel to said floor belt,
   d. a generally vertically extending pusher located between and generally transverse to the sidewalls, said pusher being slidably mounted on said tracks and being spaced from said channel and connected to said belt, and
   e. at least one batch board slidably carried by said tracks between and generally transverse to the walls, said batch board extending generally vertically and being engageable with said channel.

6. The unloading device for a vehicle body as defined in claim 5 which also comprises a tailgate generally transverse to and between the walls, said tailgate being carried by said tracks for movement from a position adjacent to a portion of said belt to a position distal from said portion.

7. The unloading device for a vehicle body as defined in claim 5 in which said floor belt load supports comprise rollers extending generally transversely of said belt.

8. The unloading device for a vehicle body as defined in claim 6 in which said pusher, batch boards and tailgate are interconnected by a flexible means so that they can be maintained in spaced apart relationship when said pusher is moved longitudinally in one direction and so said pusher can move toward said batch boards and said tailgate when said pusher is moved in a direction opposite to said one direction.

9. The unloading device for a vehicle body as defined in claim 5 which also comprises cables connected to said pusher above said belt and connected to said belt so that when said cables are foreshortened said pusher and said belt are moved generally longitudinally in the body.

10. The unloading device for a vehicle body as defined in claim 6 which also comprises first cables connected to said pusher in generally vertically spaced apart relationship and extending generally longitudinally in one direction from said pusher and connected to said belt, and a second cable connected to said pusher and extending from said pusher in a direction opposite to said one direction so that when said first cables are foreshortened and said second cable is lengthened said pusher moves generally longitudinally in one direction and when said first cables are lengthened and said second cable is foreshortened said pusher and said belt move generally longitudinally in a direction generally opposite to said one direction of movement.

11. The unloading device for a vehicle body as defined in claim 10 in which said pusher, batch boards and tailgate are interconnected by flexible connectors so that said pusher, batch boards and tailgate will be positioned in spaced apart relationship to each other when said pusher is moved in one direction.

12. The unloading device for a vehicle body as defined in claim 5 which also comprises seals between the body and said belt adjacent the sidewalls of the body so that material placed in the body cannot pass adjacent the sidewalls between the body and said belt.

13. The unloading device for a vehicle body as defined in claim 10 which also comprises seals between the body and said belt adjacent the sidewalls of the body so that material placed in the body cannot pass adjacent the sidewalls between the body and said belt.

14. The unloading device for a vehicle body as defined in claim 7 in which said floor belt load supports also comprise support plates underlying said belt and generally parallel to and interleaved between said rollers.